United States Patent
Agarwal et al.

(10) Patent No.: US 8,412,171 B2
(45) Date of Patent: Apr. 2, 2013

(54) VOICE GROUP SESSIONS OVER TELECOMMUNICATION NETWORKS

(75) Inventors: Anjana Agarwal, Wheaton, IL (US); David S. Benco, Winfield, IL (US); Byron J. Williams, Chicago, IL (US)

(73) Assignee: Alcatel Lucent, Paris (FR)

( * ) Notice: Subject to any disclaimer, the term of this patent is extended or adjusted under 35 U.S.C. 154(b) by 1195 days.

(21) Appl. No.: 12/017,203

(22) Filed: Jan. 21, 2008

(65) Prior Publication Data
US 2009/0186606 A1 Jul. 23, 2009

(51) Int. Cl.
*H04M 3/42* (2006.01)
(52) U.S. Cl. ............... 455/416; 455/412.1; 455/518
(58) Field of Classification Search .......... 455/416, 455/412.1, 516–518; 370/276–277, 296; 725/62; 386/200–202, 207
See application file for complete search history.

(56) References Cited

U.S. PATENT DOCUMENTS

| | | | |
|---|---|---|---|
| 7,623,882 B2 * | 11/2009 | Plestid et al. | 455/519 |
| 2001/0049726 A1 * | 12/2001 | Comeau et al. | 709/218 |
| 2006/0281480 A1 * | 12/2006 | Klug et al. | 455/518 |
| 2007/0218932 A1 * | 9/2007 | Sung et al. | 455/518 |
| 2008/0037580 A1 * | 2/2008 | Shaffer et al. | 370/465 |

* cited by examiner

*Primary Examiner* — Marcos Torres
(74) *Attorney, Agent, or Firm* — Duft Bornsen & Fishman LLP

(57) ABSTRACT

Telecommunication networks and methods are disclosed for providing a group session service for a plurality of participants. An application server in the telecommunication network receives a plurality of real-time media streams from the participants of the group session, and identifies voice media in the individual media streams. The voice media represents the spoken voice of the participants, and includes talking intervals separated by idle intervals (i.e., pauses in the spoken voice). The application server inputs the talking intervals as audio media elements into an audio media queue in the order received, and also outputs the audio media elements from the audio media queue in the order in which the audio media elements were inputted (i.e., in a first-in-first-out (FIFO) fashion) to generate a collective media stream for the group session. The collected audio stream is then provided to the participants of the group session.

20 Claims, 5 Drawing Sheets

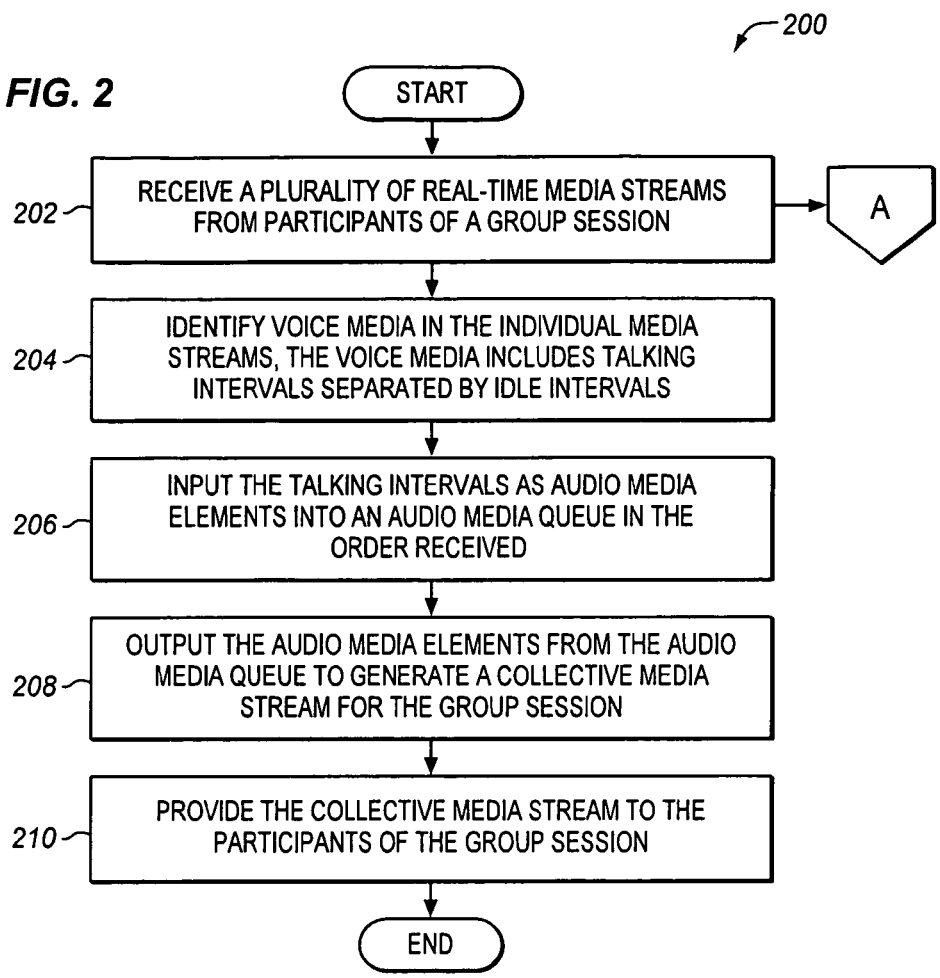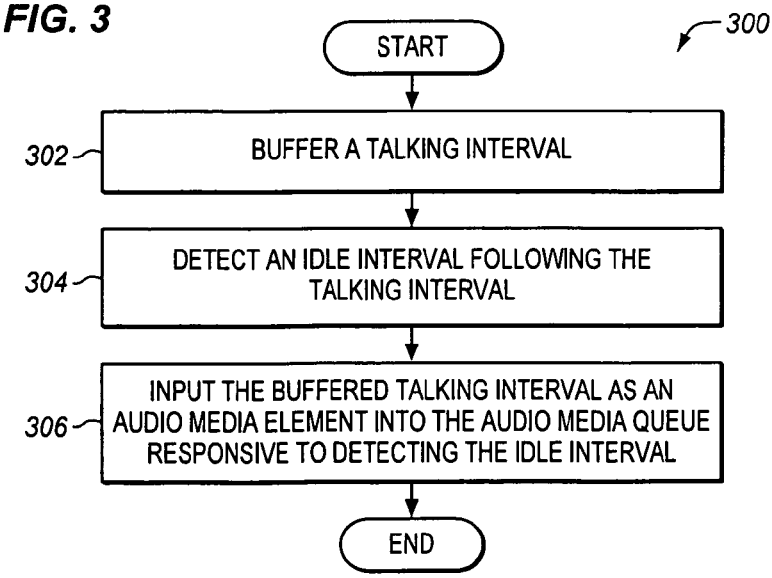

VOICE GROUP SESSIONS OVER TELECOMMUNICATION NETWORKS

BACKGROUND OF THE INVENTION

1. Field of the Invention

The invention is related to the field of telecommunication networks and, in particular, to providing voice group sessions over telecommunication networks.

2. Statement of the Problem

There are a variety of ways to provide group communication services in a communication network. For a user that is connected to the internet through a properly-equipped PC, internet-based chat rooms and instant messaging (IM) are available. A chat room is a way of communicating by sending text-based messages to other people in the same chat room in real-time. When a chat room is established on the internet, multiple users may navigate to the chat room and join. The members of the chat room may then communicate with one another, typically through text. Instant messaging offers real-time communication between one or more parties simultaneously, typically through text. A user may establish an IM session with multiple people on a "contact list" as long as these people are online. The group involved in the IM session may then communicate in real time through text messages. Although these internet services are useful, each of them has shortcomings. Internet chat rooms are typically text-based, do not effectively support voice or multimedia content, and require an appropriate internet browser to access the chat rooms. IM is also typically text-based, does not scale well to large groups, and requires the appropriate software.

For a telecommunication user, one example of a group communication service is push-to-talk (PTT) service. PTT service (or Push to Talk over Cellular) resembles a walkie-talkie service over a cellular network. PTT calls are half duplex communications meaning that one person speaks, the others listen. Traditional cellular networks and devices utilize full-duplex communications, allowing customers to call other persons on a mobile or land-line network and be able to simultaneously talk and hear the other party. PTT service advantageously allows a user to initiate a group call to multiple parties simultaneously. For a group call, the user enters multiple parties into a talk group on his/her PTT device, and when the user keys the PTT button on the PTT device, the network establishes a half-duplex channel with each of the parties in the talk group. As the user speaks, the parties of the talk group are then able to listen to the user. After the user has finished speaking and is no longer keying the PTT button, other parties of the talk group may request the floor and speak to the group.

Although PTT services provide effective group sessions, there are problems associated with PTT. First, PTT requires a specific handset and service subscription that is limited to a few providers. Second, PTT service uses a sophisticated process for granting the floor for a PTT call to one of the users while the others listen, and then switching the floor to another user as requested.

As telecommunication networks evolve, more elaborate group communication services may be provided. One type of telecommunication network gaining popularity is an IP Multimedia Subsystem (IMS) network. As set forth in the $3^{rd}$ Generation Partnership Project (3GPP), IMS provides a common core network having a network architecture that allows for various types of access networks. The access network between a communication device and the IMS network may be a cellular network (e.g., CDMA or GSM), a WLAN (e.g., WiFi or WiMAX), an Ethernet network, or another type of wireless or wireline access network. The IMS architecture is initially defined by the 3GPP to provide multimedia services to communication devices over an Internet Protocol (IP) network, as IP networks have become the most cost savings bearer network to transmit video, voice, and data. Service providers are accepting this architecture in next generation network evolution.

IMS users are thus able to receive multimedia services in a manner not previously offered. It is therefore desirable to provide effective chat sessions or other group communication sessions on an IMS network or other types of telecommunication networks that allow for exchange of voice, video, images, audio, or other multimedia data.

SUMMARY OF THE SOLUTION

Embodiments of the invention solve the above and other related problems by providing a group session service for multiple participants over a telecommunication network, such as an IMS network. As real-time voice media is received from the participants, the voice media is queued in the order in which it was received. The voice media is then played out of the queue to the participants in the order in which it was received. By queuing the voice media in the manner described herein, a sophisticated method for controlling the floor of a voice group session is not needed, as the floor is determined by what voice media is being played out of the queue at that particular time. Other multimedia data may also be received from the participants, which is like-wise queued and played out in a particular order.

Another advantage of the group communication service described herein is it scales easily to a large group. As long as a user is able to access the telecommunication network, the user is able to participate in the group session. Also, access to the group service is not dependent on having a specialized browser or application, as any communication device is properly equipped. Even further, a participant does not need to be technically sophisticated to join the session, as a simple phone call may suffice to join the session.

One embodiment comprises a method of providing a group session for a plurality of participants in a telecommunication network. The method includes receiving a plurality of real-time media streams from the participants of the group session, and identifying voice media in the individual media streams. The voice media represents the spoken voice of the participants, and includes talking intervals separated by idle intervals (i.e., pauses in the spoken voice). The method further includes inputting the talking intervals as audio media elements into an audio media queue in the order received. Talking intervals are continually added to the audio media queue in this manner. The method further includes outputting the audio media elements from the audio media queue in the order in which the audio media elements were inputted (i.e., in a first-in-first-out (FIFO) fashion) to generate a collective media stream for the group session, and providing (i.e., multicasting) the collective media stream to the participants of the group session.

In other embodiments, if audio files are identified in the media streams from the participants, then the audio files are also inputted as audio media elements into the audio media queue in the order received. If image or video files are identified in the media streams from the participants, then the image or video files are inputted as visual media elements into a visual media queue in the order received. If audio/video files are identified in the data files, then the audio/video files are also inputted in the visual media queue as visual media elements in the order received, and inputted in the audio media queue as audio media elements in the order received.

The invention may include other exemplary embodiments described below.

DESCRIPTION OF THE DRAWINGS

The same reference number represents the same element or same type of element on all drawings.

FIG. 2 is a flow chart illustrating a method of providing a group session service in an exemplary embodiment of the invention.

FIG. 3 is a flow chart illustrating a method of inputting the talking intervals into an audio media queue in an exemplary embodiment of the invention.

DETAILED DESCRIPTION OF THE INVENTION

FIGS. 1-6 and the following description depict specific exemplary embodiments of the invention to teach those skilled in the art how to make and use the invention. For the purpose of teaching inventive principles, some conventional aspects of the invention have been simplified or omitted. Those skilled in the art will appreciate variations from these embodiments that fall within the scope of the invention. Those skilled in the art will appreciate that the features described below can be combined in various ways to form multiple variations of the invention. As a result, the invention is not limited to the specific embodiments described below, but only by the claims and their equivalents.

Figure 1:
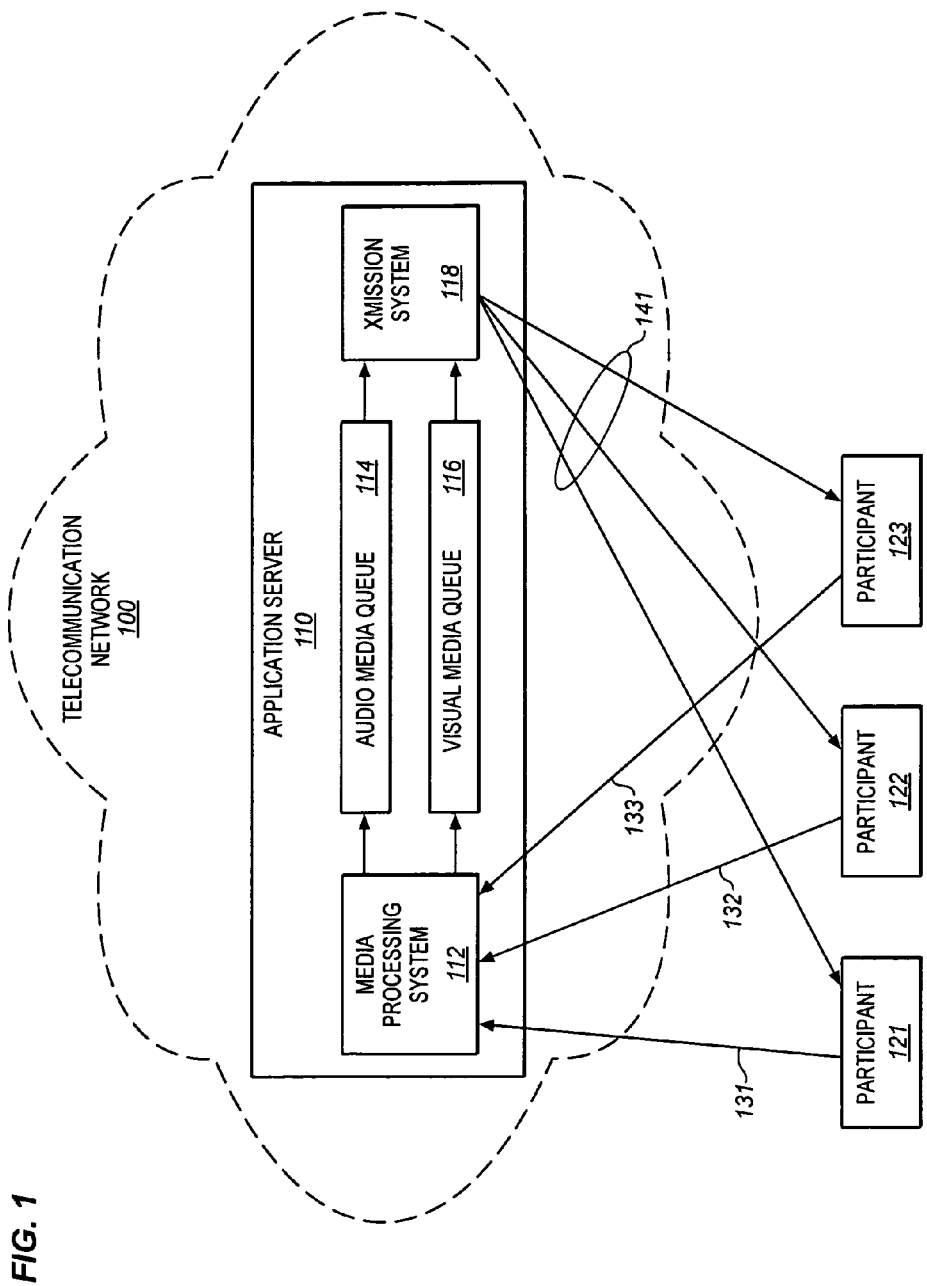
FIG. 1 illustrates a telecommunication network in an exemplary embodiment of the invention.

FIG. 1 illustrates a telecommunication network 100 in an exemplary embodiment of the invention. One example of a telecommunication network is an IMS network. Telecommunication network 100 includes an application server 110 adapted to provide a group session service. Application server 110 includes a media processing system 112, an audio media queue 114, a visual media queue 116, and a transmission system 118. Those skilled in the art will appreciate that telecommunication network 100 may include multiple other network elements that are involved in a typical call or session. For instance, in an IMS network, additional network elements may include a serving-call session control function (S-CSCF), a proxy-call session control function (P-CSCF), a BGCF, an MGCF, etc, which are not shown for the sake of brevity.

Processing system 112 comprises any system, server, or component adapted to receive and process media streams from participants 121-123 of a group session. Processing system 112 may be comprised of one or more processors that execute instructions stored on a memory to process the media streams. Audio media queue 114 and visual media queue 116 comprise any type of data structure that receives elements as input, and outputs the elements in a particular order. Audio media queue 114 and visual media queue 116 may comprise first-in-first-out (FIFO) data structures where the first element added to the queue will be the first element removed from the queue. Transmission system 118 comprises any system, server, or component adapted to transmit a data stream, which is outputted from audio media queue 114 and/or visual media queue 116, to participants 121-123. One example of transmission system 118 is a multicast server or multicast element.

Assume for this embodiment that a group session is being established or has been established, and that participants 121-123 have joined the group session. Participants 121-123 may join the group session in a variety of ways. Participants 121-123 are each operating a communication device, such as a mobile phone, a PDA, etc., through which they may place a call to application server 110, may enter a URL, or access the group session in another manner. Although three participants 121-123 are shown, many more participants 121-123 may join the group session by accessing application server 110.

When joined in the session, participants 121-123 may each speak and/or upload data files which are shared with the other participants. The voice data and data files from participants 121-123 are collectively illustrated as media streams 131-133, respectively. Participants 121-123 also receive a collective data stream 141 from application server 110. Collective data stream 141 comprises combined data from each of the participants 121-123 of the group session, which may be voice, data files, etc.

Unlike a typical group session, the voice conversation in this embodiment resembles half-duplex communications. When participants 121-123 speak, application server 110 will queue the voice conversations, and play out the voice conversations in a particular order, as will be described below. Only one speaker will be heard at a time. Thus, application server 110 controls the floor for the group session based on how the voice conversations are queued. The voice conversations may also be queued with other audio data, video data, etc. As a result, application server 110 can effectively control how media is provided back to the participants 121-123 of the group session through the queuing function.

FIG. 2 is a flow chart illustrating a method 200 of providing a group session service in an exemplary embodiment of the invention. The steps of method 200 will be described with reference to telecommunication network 100 in FIG. 1. The steps of the flow chart in FIG. 2 are not all inclusive and may include other steps not shown.

In step 202, processing system 112 receives the media streams 131-133 from participants 121-123. The media streams may comprise any type of multimedia content, such as voice, digital pictures, images, audio, or video. In step 204, processing system 112 identifies voice media in the individual media streams. The voice media (i.e., the spoken voice of one or more of participants 121-123) includes talking intervals separated by idle intervals (or silence intervals). For instance, if a participant speaks, then pauses, and speaks again, the voice media will comprise a talking interval, an idle interval (the pause), and another talking interval.

In step 206, processing system 112 inputs the talking intervals, from each of the individual media streams 131-133, as audio media elements into audio media queue 114 in the order received. Audio media queue 114 is a data structure that receives audio media elements, and plays out the audio media elements in the order in which they were received. Thus, processing system 112 inputs the talking intervals as audio media elements. Processing system 112 may input other types of audio data in audio media queue 114 as audio media elements along with the talking intervals, such as music, audio clips, etc.

There are multiple ways of inputting the talking intervals into audio media queue 114. FIG. 3 is a flow chart illustrating a method 300 of inputting the talking intervals into audio media queue 114 in an exemplary embodiment of the invention. Responsive to receiving voice media for each individual media stream 131-133, processing system 112 buffers a talking interval in the voice media in step 302. In step 304, processing system 112 detects an idle interval following the talking interval. An idle interval comprises a time period of silence in a voice conversation that is greater than a threshold time. For instance, a pause in a voice conversation that is greater than 1 second, 2 seconds, etc, may be defined as an idle interval. In step 306, processing system 112 inputs the buffered talking interval as an audio media element into audio media queue 114 responsive to detecting the idle interval. Thus, by detecting an idle interval in the voice media, processing system 112 is able to detect a talking interval and input the talking interval into audio media queue 114.

Figure 4:
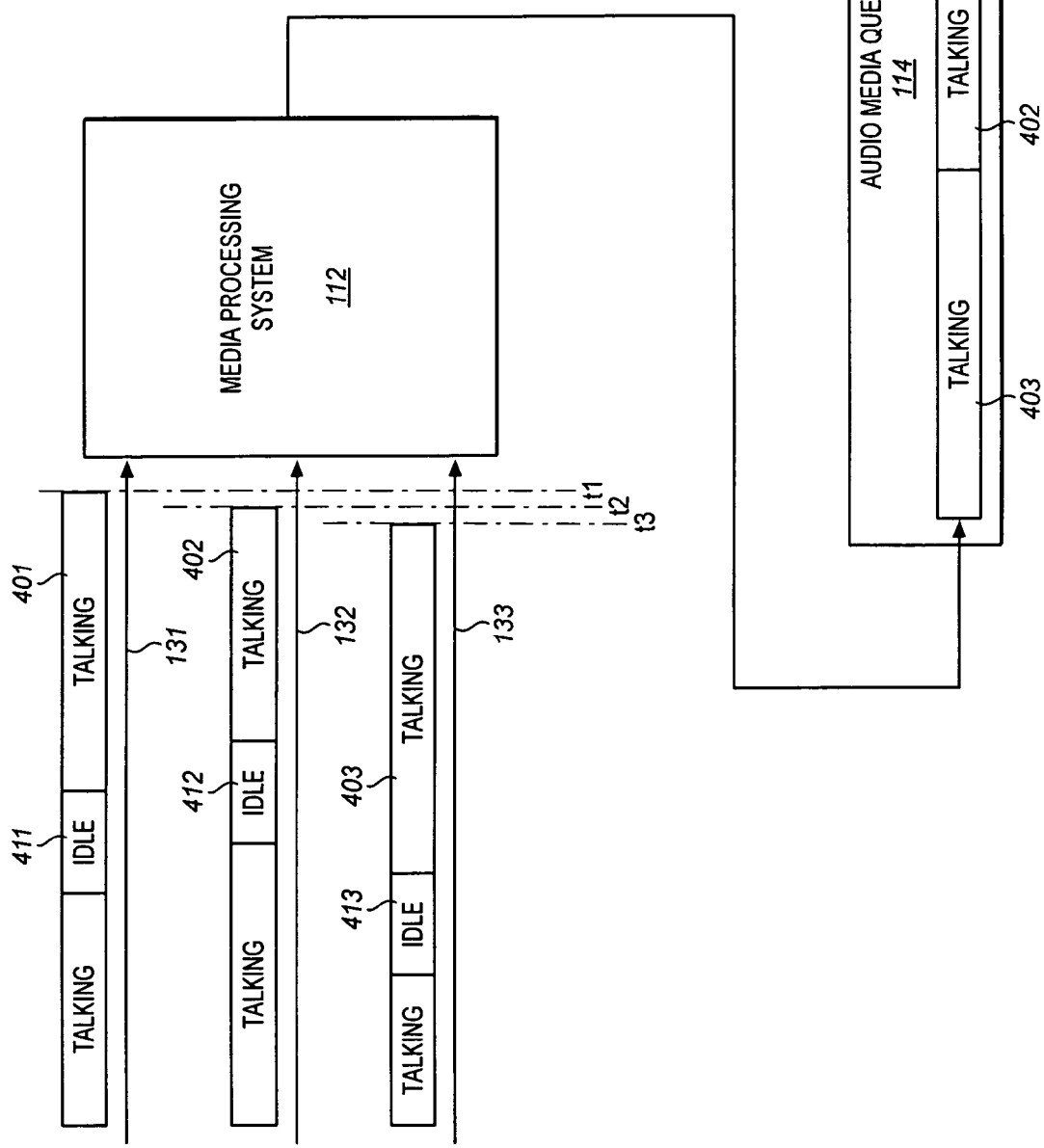
FIG. 4 illustrates a processing system inputting talking intervals in an audio media queue in an exemplary embodiment of the invention.

Processing system 112 inputs the talking intervals from the individual media streams in the order they were received. One way of defining this order is based on when the talking intervals are first received. FIG. 4 illustrates processing system 112 inputting talking intervals in audio media queue 114 in an exemplary embodiment of the invention. Media stream 131 comprises voice media having a talking interval 401 followed by an idle interval 411 that is received at time t1. Media stream 132 comprises voice media having a talking interval 402 followed by an idle interval 412 that is received at time t2. Media stream 133 comprises voice media having a talking interval 403 followed by an idle interval 413 that is received at time t3.

In this example, talking interval 401 is received before talking interval 402 and talking interval 403, and is thus considered as received first. Processing system 112 then inputs talking interval 401 into audio media queue 114 first responsive to detecting idle interval 411. Talking interval 402 is received before talking interval 403, and is thus considered as received second. Processing system 112 then inputs talking interval 402 into audio media queue 114 next responsive to detecting idle interval 412. Talking interval 403 is received next, so processing system 112 inputs talking interval 403 into audio media queue 114 next responsive to detecting idle interval 413. This process repeats in order to populate audio media queue 114 with the talking intervals in the order in which they were received.

Figure 5:
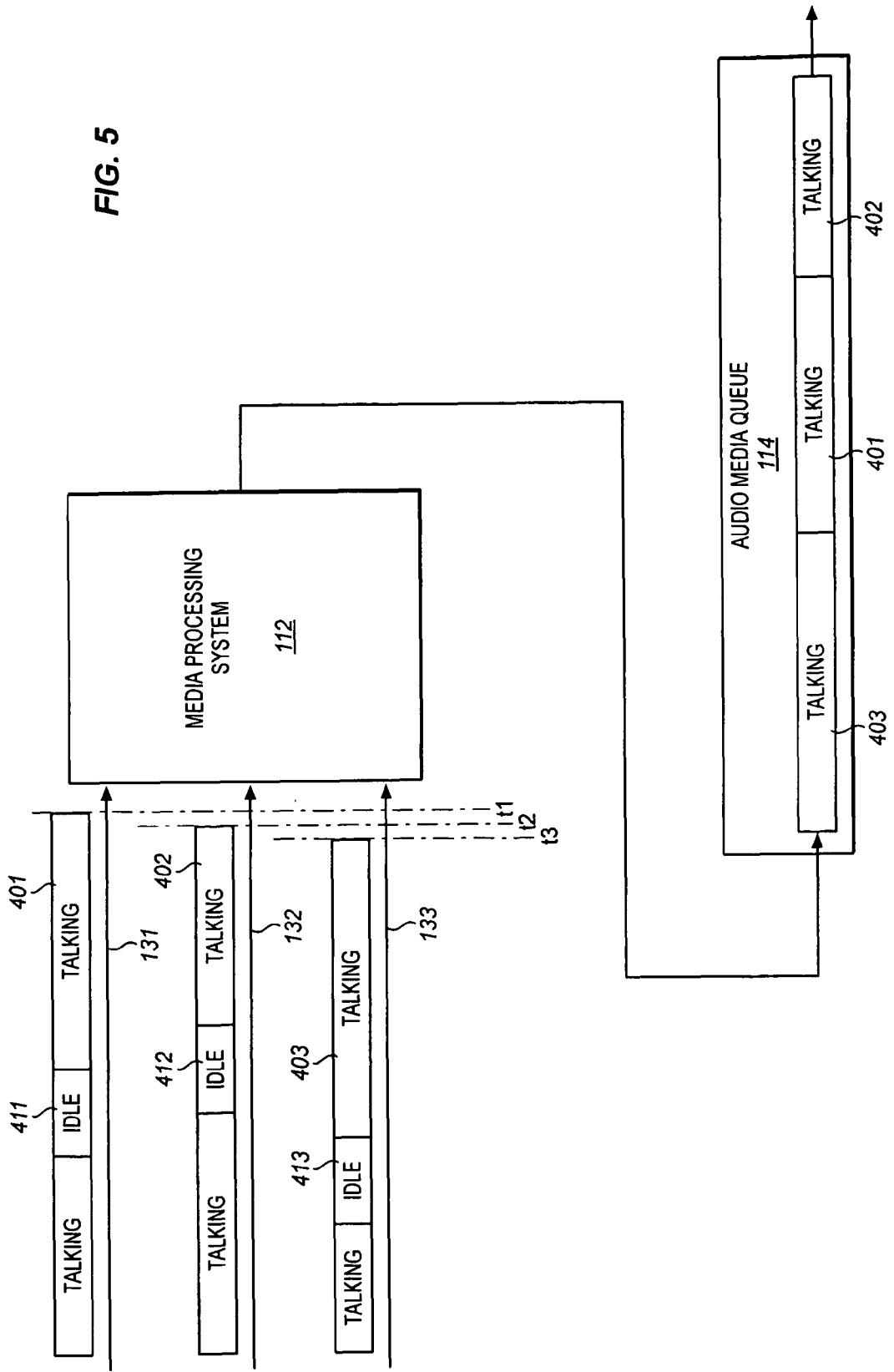
FIG. 5 illustrates a processing system inputting talking intervals in an audio media queue in another exemplary embodiment of the invention.

Another way of defining the order of receipt is based on when a complete talking interval is detected. FIG. 5 illustrates processing system 112 inputting talking intervals in audio media queue 114 in another exemplary embodiment of the invention. Processing system 112 buffers talking intervals 401-403 until an idle interval 411-413 is detected. Talking interval 402 ends before either talking intervals 401 or 403 and idle interval 412 is detected first, so talking interval 402 is considered as received first. Processing system 112 then inputs talking interval 402 into audio media queue 114 first responsive to detecting idle interval 412. Talking interval 401 ends before talking interval 403 and idle interval 411 is detected next, so talking interval 401 is considered as received second. Processing system 112 thus inputs talking interval 401 into audio media queue 114 next responsive to detecting idle interval 411. Talking interval 403 then ends and idle interval 413 is detected next, so processing system 112 inputs talking interval 403 into audio media queue 114 next responsive to detecting idle interval 413. This process repeats in order to populate audio media queue 114 with the talking intervals in the order in which they were received.

Processing system 112 thus inputs talking intervals from media streams 131-133 as audio media elements into audio media queue 114 in the order received (possibly along with other data files as is described in later embodiments). Concurrently, audio media queue 114 outputs the audio media elements to generate a collective media stream 141 for the group session in step 208 of FIG. 2. The collective media stream 141 represents data generated by outputting audio media elements from audio media queue 114 in a particular order. As illustrated in FIG. 4, talking interval 401 will be outputted first, then talking interval 402, and then talking interval 403. Thus, the collective media stream 141 will be comprised of talking interval 401, talking interval 402, and talking interval 403 in that order.

In step 210 of FIG. 2, transmission system 118 provides the collective media stream 141 to the participants of the group session, such as by multicasting. Transmission system 118 may encrypt the collective media stream 141 in a desired manner to secure the media stream. Participants 131-133 are then able to listen to the audio data included in the collective media stream 141. For the example provided in FIG. 4, participants 131-133 will first hear the voice of participant 131 (as talking interval 401), then the voice of participant 132 (as talking interval 402), and then the voice of participant 133 (as talking interval 403).

One advantage of this system is that the floor for the group session is automatically handled through audio media queue 114. Instead of granting the floor to a participant for a particular period of time, each participant is able to speak at will. Processing system 112 receives the voice media from each participant 121-123, and inputs the talking intervals in the order received. Thus, the floor for the group session depends on the order in which the talking intervals were inputted into audio media queue 114. There is no need for a sophisticated scheme for granting the floor to participants 121-123. Additionally, the floor is easily switched between participants merely by inputting the talking intervals into audio media queue 114 in a particular order.

Figure 6:
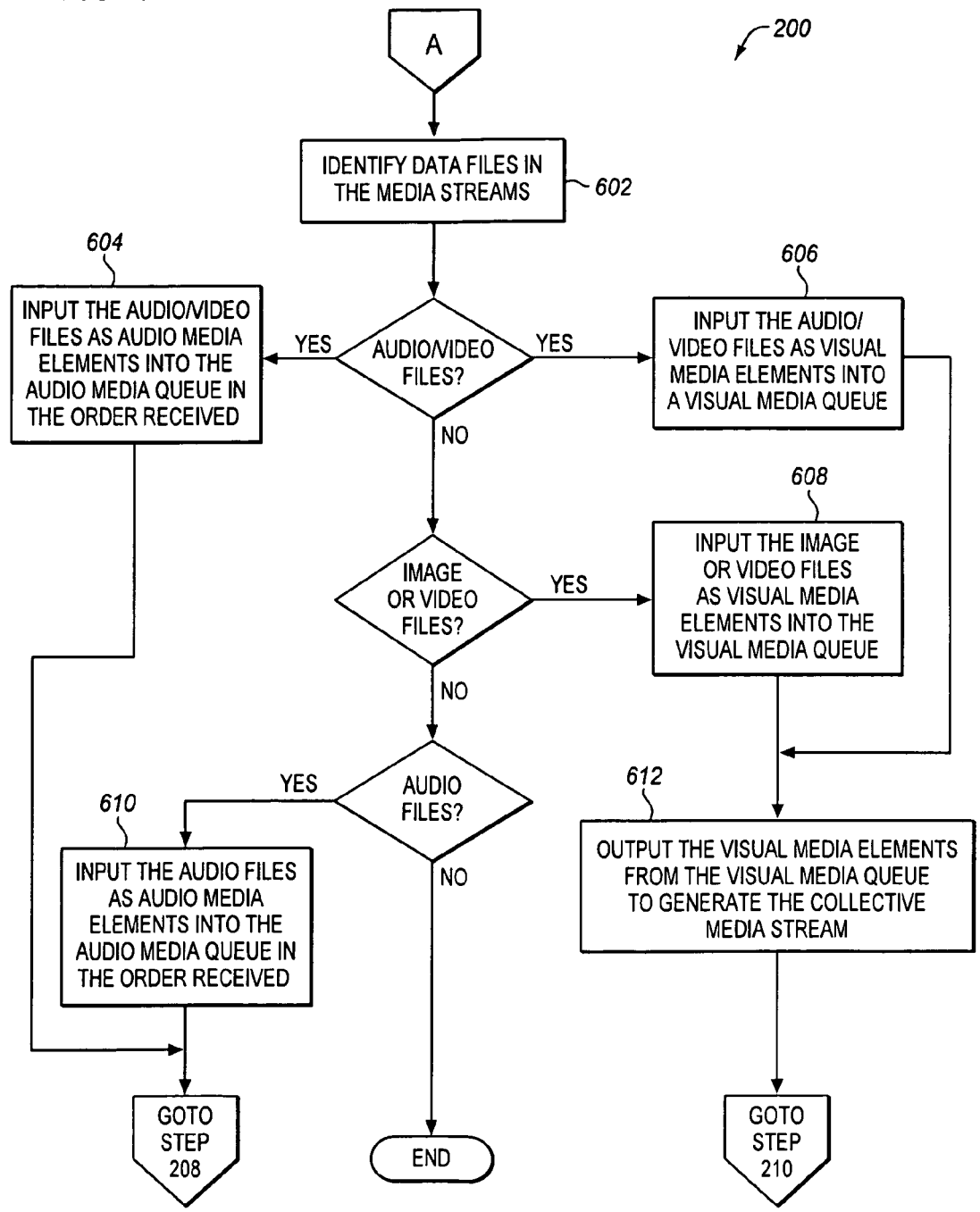
FIG. 6 is a flow chart illustrating additional steps of the method of FIG. 2 to handle data files in an exemplary embodiment of the invention.

In addition to voice media, the media streams 131-133 from participants may include other multimedia data, such as audio/video files, digital pictures, still images, audio files, or any other type of digitized data. FIG. 6 is a flow chart illustrating additional steps of method 200 to handle data files in an exemplary embodiment of the invention. In step 602, processing system 112 further identifies data files in the media streams 131-133. The data files are in addition to or in place of the voice media. Processing system 112 then determines if the data files include audio/video files (i.e., both an audio portion and a video portion). If the data files include audio/video files, then processing system 112 inputs the audio/video files as audio media elements into audio media queue 114 in the order received (see also FIG. 1) in step 604. The audio/video files are inputted in audio media queue 114 along with the talking intervals of the voice media. Processing system 112 also inputs the audio/video files as visual media elements into visual media queue 116 in the order received (see also FIG. 1) in step 606. Visual media queue 116 is a data structure that receives visual media elements, and plays out the visual media elements in the order in which they were received. Thus, processing system 112 inputs the audio/video files as visual media elements. Processing system 112 may input other types of visual data in visual media queue 116 as visual media elements along with the audio/video files, such as video clips, digital pictures, etc.

In addition to inserting audio/video files in both audio media queue 114 and visual media queue 116, processing system 112 is adapted to synchronize audio media queue 114 and visual media queue 116 so that audio/video files are outputted concurrently. For instance, processing system 112 may set a synchronization flag in an audio/video file when it is inserted in both queues 114 and 116. When an audio/video file with a synchronization flag set is ready to be outputted from either queue 114, 116, the queues 114, 116 are synchronized so that the audio/video file is output at the same time.

If the data files identified in step 602 do not include audio/video files, then processing system 112 determines if the data files include still images, video clips, digital pictures, etc (i.e., visual data only with no audio). Files that include still images, video clips, digital pictures, or other visual data are referred to as image or video files. If the data files include image or video files, then processing system 112 inputs the image or video files as visual media elements into visual media queue 116 in the order received (see also FIG. 1) in step 608. The image or video files may be inputted in visual media queue 116 along with the audio/video files.

If the data files do not include audio/video files or image or video files, then processing system 112 determines if the data files include audio files (i.e., audio only with no video). If the data files include audio files, then processing system 112 inputs the audio files as audio media elements into audio media queue 114 in the order received (see also FIG. 1) in step 610. The audio files are inputted in audio media queue 114 along with the talking intervals of the voice media.

In steps 606 and 608 above, the visual media queue 116 is populated with visual media elements. Thus, visual media queue 116 is played out in a similar fashion as audio media queue 114. In step 612 of FIG. 6, visual media queue 116 outputs the visual media elements to generate the collective media stream 141 for the group session. Transmission system 118 provides the collective media stream 141 to the participants of the group session in step 210 of FIG. 2. Participants 131-133 are then able to view the visual data included in the collective media stream 141. Where both audio media queue 114 and visual media queue 116 are both outputting elements, transmission system 118 is able to merge the data to generate a collective data stream 141 that includes both audio data and visual data. For example, the collective data stream 141 may comprise an RTP stream that includes both audio data and visual data that have been merged.

Although specific embodiments were described herein, the scope of the invention is not limited to those specific embodiments. The scope of the invention is defined by the following claims and any equivalents thereof.

We claim:

1. A method comprising:
receiving individual media streams from multiple participants of a group session established over a telecommunication network;
identifying voice media for the participants in the individual media streams that includes talking intervals representing the spoken voice of the participants;
identifying audio/video files in the individual media streams that include audio portions and video portions;
inputting the talking intervals and the audio portions of the audio/video files as audio media elements into an audio media queue in the order received;
inputting the video portions of the audio/video files as video media elements into a visual media queue in the order received; and
outputting the audio media elements from the audio media queue and the video media elements from the visual media queue to generate a collective media stream for the group session that is provided to the participants;
wherein the audio media queue and the visual media queue are synchronized in order to output the audio portions of the audio/video files from the audio media queue concurrently with the corresponding video portions of the audio/video files from the visual media queue in generating the collective media stream.

2. The method of claim 1 further comprising:
identifying audio files in the individual media streams; and
inputting the audio files as audio media elements into the audio media queue in the order received.

3. The method of claim 1 further comprising:
identifying video files in the individual media streams; and
inputting the video files as visual media elements into the visual media queue in the order received.

4. The method of claim 1 wherein outputting the audio media elements from the audio media queue and the video media elements from the visual media queue comprises:
outputting the audio media elements from the audio media queue and the video media elements from the visual media queue in a first-in-first-out (FIFO) fashion.

5. The method of claim 1 further comprising:
multicasting the collective media stream to the participants of the group session.

6. The method of claim 1 further comprising:
encrypting the collective media stream prior to providing the collective media stream to the participants of the group session.

7. The method of claim 1 wherein identifying voice media for the participants in the individual media streams comprises:
for the voice media in each individual media stream:
buffering a talking interval for the individual media stream;
detecting an idle interval following the talking interval; and
inputting the buffered talking interval as an audio media element into the audio media queue responsive to detecting the idle interval.

8. The method of claim 7 wherein detecting an idle interval following the talking interval comprises:
detecting a period of silence in the spoken voice of a participant that is greater than a threshold time.

9. A system comprising:
an audio media queue;
a visual media queue;
a media processor configured to receive individual media streams from multiple participants of a group session established over a telecommunication network, to identify voice media for the participants in the individual media streams that includes talking intervals representing the spoken voice of the participants, and to identify audio/video files in the individual media streams that include audio portions and video portions;
the media processor is further configured to input the talking intervals and the audio portions of the audio/video files as audio media elements into the audio media queue in the order received, and to input the video portions of the audio/video files as video media elements into the visual media queue in the order received; and
a transmission system configured to provide a collective media stream for the group session to the participants that is generated by outputting the audio media elements from the audio media queue and the video media elements from the visual media queue;
wherein the audio media queue and the visual media queue are synchronized in order to output the audio portions of the audio/video files from the audio media queue concurrently with the corresponding video portions of the audio/video files from the visual media queue in generating the collective media stream.

10. The system of claim 9 wherein:
the media processor is further configured to identify audio files in the individual media streams, and to input the audio files as audio media elements into the audio media queue in the order received.

11. The system of claim 9 wherein:
the media processor is further configured to identify video files in the individual media streams, and to input the video files as visual media elements into the visual media queue in the order received.

12. The system of claim 9 wherein:
the audio media queue and the visual media queue comprise first-in-first-out (FIFO) queues.

13. The system of claim 9 wherein:
the transmission system is further configured to multicast the collective media stream to the participants of the group session.

14. The system of claim 9 wherein:
the transmission system is further configured to encrypt the collective media stream prior to providing the collective media stream to the participants of the group session.

15. The system of claim 9 wherein:
for the voice media in each individual media stream, the media processor is further configured to:
buffer a talking interval for the individual media stream;
detect an idle interval following the talking interval; and
input the buffered talking interval as an audio media element into the audio media queue responsive to detecting the idle interval.

16. The system of claim 15 wherein:
the media processor is further configured to detect a period of silence in the spoken voice of a participant that is greater than a threshold time in order to detect an idle interval.

17. A system comprising:
an application server of an IP Multimedia Subsystem (IMS) network that connects to multiple participants of a group session;
the application server is configured to receive individual media streams from the participants, to identify voice media in the individual media streams that includes talking intervals representing the spoken voice of the participants, and to identify audio/video files in the individual media streams that includes audio portions and video portions;
the application server is further configured to populate an audio media queue with the talking intervals and the audio portions of the audio/video files in the order in which they were received;
the application server is further configured to populate a visual media queue with the video portions of the audio/video files in the order in which they were received;
the application server is further configured to output data from the audio media queue and from the visual media queue to generate a collective media stream for the group session that is provided to the participants;
the application server is further configured to synchronize the audio media queue and the visual media queue in order to output the audio portions of the audio/video files from the audio media queue concurrently with the corresponding video portions of the audio/video files from the visual media queue.

18. The system of claim 17 wherein:
the application server is further configured to identify audio files in the individual media streams, and to populate the audio media queue with the audio files in the order received.

19. The system of claim 17 wherein:
the application server is further configured to identify video files in the individual media streams, and to populate the visual media queue with the video files in the order received.

20. The system of claim 17 wherein:
the audio media queue and the visual media queue comprise first-in-first-out (FIFO) queues.

* * * * *